United States Patent Office 3,660,409
Patented May 2, 1972

---

3,660,409
METHOD FOR MAKING ENOL ETHERS
Siegfried H. Schroeter, Schenectady, N.Y., assignor to
General Electric Company
No Drawing. Filed Oct. 27, 1969, Ser. No. 869,892
Int. Cl. C07c *41/00*
U.S. Cl. 260—611 A   7 Claims

ABSTRACT OF THE DISCLOSURE

The pyrolysis of 3-alkoxyoxetanes, for example, 2,2-diphenyl-3-ethoxyoxetane, has been found to provide for the production of branched enol ethers, such as 1,1-diphenyl-2-ethoxyethylene. The branched enol ethers can be employed as fragrants and converted to branched aldehydes, ketones and polyalkoxyalkylenes.

---

The present invention relates to a method for making branched enol ethers by pyrolyzing 3-alkoxyoxetanes.

Prior to the present invention, various methods were available for making branched enol ethers included by the formula, (1) 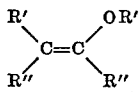

where R' is selected from monovalent hydrocarbon radicals and halogenated monovalent hydrocarbon radicals, and R'' is selected from hydrogen and R' radicals. One method involves the initial production of a branched acetal intermediate by the acetalization of certain branched carbonyl compounds, such as branched aldehydes, or ketones, followed by the dealcoholation of the acetals. Another method involves the vinylation by substituted acetylenes. Although these methods provide useful laboratory syntheses of branched enol ethers of Formula 1, they are not suitable for commercial production of such materials. The branched aldehydes and ketones required in the syntheses of branched enol ethers of Formula 1 must be specially synthesized and are not generally available in quantities which would qualify them as commercial source materials. In addition, the substituted acetylenes cannot be employed to make branched enol ethers where R' and R'' of Formula 1 are both monovalent hydrocarbon since the substituted acetylene can only be substituted with one monovalent hydrocarbon radical.

The present invention is based on the discovery that branched enol ethers of Formula 1 can be made readily by pyrolyzing 3-alkoxyoxetanes of the formula, (2) 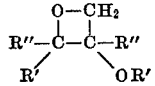

as shown by the following equation,

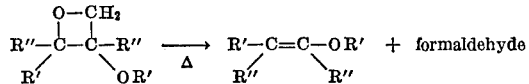

where R' and R'' are as previously defined.

Some of the radicals included by R' and R'' are more particularly monovalent aryl radicals such as phenyl, chlorophenyl, naphthyl, xylyl, tolyl, etc.; lower alkyl radicals such as methyl, ethyl, propyl, butyl, pentyl, hexyl, heptyl, octyl, etc. In Formula 1, R' and R'' respectively can be the same radical or a mixture of any two of the aforementioned radicals.

In accordance with the present invention, there is provided a method for making branched enol ethers of Formula 1, comprising (1) pyrolyzing at a temperature in the range of between 200° C. to 450° C., an alkoxyoxetane mixture comprising at least a major amount of a 3-alkoxyoxetane of Formula 2, and (2) recovering the branched enol ether from the resulting mixture.

The 3-alkoxyoxetane of Formula 2 and methods for making them are described in my copending application Ser. No. 671,576, filed Sept. 29, 1967 and assigned to the same assignee as the present invention. As described therein, reaction between readily available vinyl ethers and carbonyl compounds, such as aldehydes and ketones, for example acetone, benzaldehyde and the like, can be effected in the presence of ultraviolet light to produce 3-alkoxyoxetanes, or a mixture of isomeric 2- and 3-alkoxyoxetanes, having at least a major amount of the 3-alkoxyoxetane. Depending upon the particular enol ether made by the method of the present invention, it may be desirable to employ either a 3-alkoxyoxetane, or a mixture of isomeric alkoxyoxetanes as previously indicated, which preferably contains at least 70 mole percent of 3-alkoxyoxetane based on the total moles of alkoxyoxetane of the mixture. Experience has shown that the pyrolysis of such alkoxyoxetanes, or isomeric mixtures thereof, can result in the production of reaction by-products such as olefins, ketones, aldehydes, esters, water, in addition to the desired enol ethers of Formula 1. In view of the marked differences in boiling points of the various components of the pyrolysis mixture, distillation can provide for ready separation of the desired enol ether as the major fraction.

Included by the enol ethers of Formula 1 there are, for example, 1,1-dimethyl-2-ethoxyethylene,
1,1-dimethyl-2-n-butoxyethylene,
1-phenyl-2-isopropoxylethylene,
1-p-chlorophenyl-2-ethoxyethylene,
1-p-methylphenyl-2-n-propoxyethylene,
1-phenyl-1-ethyl-2-methoxyethylene,
1,1-di-p-chlorophenyl-2-ethoxyethylene.

Among the 3-alkoxyoxetanes which are included by Formula 2 are, for example, 2,2-dimethyl-3-ethoxyoxetane,
2,2-dimethyl-2-n-butoxyoxetane,
2-phenyl-3-isopropoxyoxetane,
2-p-chlorophenyl-3-ethoxyoxetane,
2,2-di-p-methylphenyl-3-ethoxyoxetane.

In the practice of the invention, the branched enol ethers are made by pyrolyzing 3-alkoxyoxetanes as shown by Formula 2, or an isomeric alkoxyoxetane mixture containing at least a major proportion of such 3-alkoxyoxetanes.

Although a pyrolysis temperature of from 200° C. to 450° C. will provide for effective results, it is preferred to use a temperature in the range of between 250° C. to 400° C. In certain situations, the cleavage of the 3-alkoxyoxetane can be catalyzed when effected in the presence of acidic materials such as Lewis acids, carboxylic acids, mineral acids, etc. The pyrolysis of the 3-alkoxyoxetane can be effected either under atmospheric conditions, or in a closed system. Autogenous pressures of from 1 atmosphere or less, to up to 100 atmospheres or more can be employed, if desired. In particular situations, higher pressures can be utilized by use of an inert gas in a closed system.

It has been found that a maximum yield of desired enol ether can be achieved, if pyrolysis of the alkoxyoxetane is achieved in 10 seconds or less at the above pyrolysis temperature to minimize the decomposition of desired end product and the production of undesirable by-products. One method for reducing decomposition of enol ether is to reduce the contact time of the desired end product at the pyrolysis temperature. For example, at atmospheric pressures, the pyrolysis mixture can be poured rapidly through a heated column containing particulated, or crushed siliceous solids, such as boiling chips, silica, etc., at temperatures sufficient to effect pyrolysis. In instances where an alkoxyoxetane mixture is pyrolyzed containing 2-alkoxyoxethanes, olefins and esters can be produced as by-products. The pyrolysis mixture can be treated with a suitable organic solvent such as ether, benzene, etc. The organic layer then can be further extracted with water, the organic layer separated, dried and distilled to provide for the recovery of the enol ether.

In order that those skilled in the art will be better able to practice the invention, the following examples are given by way of illustration and not by way of limitation. All parts are by weight.

EXAMPLE 1

A solution of 12 parts of benzophenone in 100 parts ethyl vinyl ether was irradiated with ultraviolet light for 24 hours having a wavelength of from about 2,000 to 3,500 angstroms. Excess ethyl vinyl ether was then distilled from the resulting mixture. A mixture was obtained consisting of about 75 mole percent of 2,2-diphenyl-3-ethoxyoxetane and about 25 mole percent of 4,4-diphenyl-2-ethoxyoxetane based on VPC analysis.

The above mixture was refluxed under atmospheric conditions at a temperature in the range of from 310° C. to 350° C. until the resulting mixture was almost free of oxetane, based on its NMR spectrum. The mixture was then distilled. A 60 percent yield of a product was obtained boiling at 124/125° C./2.5 mm. Based on its method of preparatioin and its NMR spectra, the product was 1,1 - diphenyl-2-ethoxyethylene having the formula,

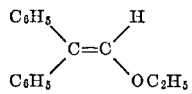

The identity of the above product was further confirmed by its infra-red and nuclear magnetic resonance spectrum and by its elemental analysis for $C_{16}H_{16}O$: Calcd.: C, 85.68; H, 7.19; Mol. weight, 224.24, Found: C, 85.82; H, 7.29; Mol. weight, 238. In addition to the enol ether, there also was recovered benzophenone, diphenylethylene, and unreacted oxetane.

EXAMPLE 2

There as passed 23.5 parts of 2,2-diphenyl-3-ethoxyoxetane through a glass column filled with boiling chips heated to 400° C. There was recovered 21.7 parts of pyrolysis product. The pyrolysis product was mixed with 50 parts of ether and the resulting solution was extracted with water and dried over magnesium sulfate for 24 hours. The organic layer was separated and fractionated. There was obtained a 50 percent yield of product. The infra-red spectrum of the product was identical to the product of Example 1. Based on method of preparation and its infra-red spectrum, the product was 1,1-diphenyl-2-ethoxyoxetane.

EXAMPLE 3

In accordance with the procedure of Example 2, 43.2 parts of a mixture of 75 mole percent of 2-phenyl-3-n-butoxyoxetane and 25 mole percent of 4-phenyl-2-n-butoxyoxetane was pyrolyzed at 360° C. There was obtained 35 parts of pyrolysis product. The product was combined with 100 parts of ether, extracted with water, and the organic layer was dried over magnesium sulfate. Distillation of the organic layer resulted in the production of a 54 percent yield of a major fraction having a boiling rang between 108° C.–112° C./7 mm. Based on the NMR spectra of the mixture the product was a mixture of isomeric cis- and trans-1-phenyl - 2 - n-butoxy-ethylene which was further characterized by its elemental analysis for $C_{12}H_{16}O$: Calcd.: C, 81.77; H, 9.15, Found: C, 81.94; H, 9.11.

EXAMPLE 4

In accordance with the method of Example 2, 50 parts of a mixture of 75 mole percent of 2-phenyl-3-ethoxyoxetane and 25 mole percent of 4-phenyl-2-ethoxyoxetane was pyrolyzed at 360° C. The pyrolysis product was then treated with ether and extracted with water as previously described. Upon distillation of the organic layer, there was obtained a 58 percent yield of product having a boiling range between 104° C. to 106° C. at 17 mm. Based on method of preparation, its infra-red and NMR spectrum and upon its elemental analysis (Calcd.: C, 81.04; H, 8.16, Found: C, 80.99; H, 8.21), the product was a mixture of cis- and trans-β-ethoxy styrene.

EXAMPLE 5

The method of Example 2 was employed to pyrolyze 35.4 parts of 2,2-dimethyl-3-n-butoxyoxetane at 380° C. The resulting mixture was then combined with ether and the resulting solution extracted with water and dried. Fractionation of the organic layer resulted in a 56 percent yield of product which boiled at 85° C. at 144 mm. Based on method of preparation and its infra-red spectrum, the product was 2-methyl-1-n-butoxypropylene. Its identity was further confirmed by elemental analysis for $C_6H_{16}O$: Calc.: C, 74.94; H, 12.58. Found: C, 74.76; H, 12.56.

Several parts of the above-described enol ether are polymerized to a polyalkoxyalkylene by the following procedure:

EXAMPLE 6

In accordance with the procedure of Example 5, 50 parts of 2,2-dimethyl-3-ethoxyoxetane was pyrolyzed at 360° C. There was obtained a 41 percent yield of 2-methyl-1-ethoxypropene of the formula,

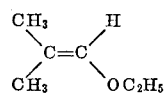

having a boiling point of 88–89° C. which was characterized by its NMR spectrum and its elemental analysis. Calcd. for $C_6H_{12}O$: C, 71.95; H, 12.08, Found: C, 72.12; H, 12.15.

EXAMPLE 7

In accordance with the procedure of Example 6, 50 parts of 2-methyl-3-methoxyoxetanes were pyrolyzed at 380° C. There was obtained a 30 percent yield of cis- and trans-methylpropenyl ether having a boiling point of 47–49° C.

A mixture of two parts of the above methylpropenyl ether, 10.2 parts of diethyl aluminum chloride and about 28 parts of anhydrous toluene is maintained at −70° C. for about 24 hours. There is obtained 1.1 parts of a solid polymer having a M.P. of 200° C. and [η]=0.40 in toluene at 30° C. The polymer is dissolved in acetone to make a 10 percent solution. A film is cast from the solution onto an aluminum substrate. The film is found to be a valuable insulating coating and dielectric film.

Although the above examples are limited to only a few of the very many ways in which the branched enol ethers can be made in accordance with the practice of the invention, it should be understood that the present invention is directed to a method for making a much broader variety of branched enol ethers of Formula 1 utilizing 3-alkoxyoxetanes of Formula 3.

I claim:

1. A method for making enol ethers of the formula,

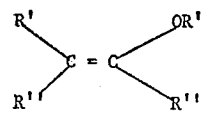

which comprises pyrolyzing at a temperature in the range of between 250° C. to 450° C., an alkoxyoxetane selected from the group consisting of a 3-alkoxyoxetane of the formula,

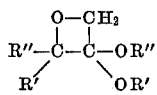

an isomeric mixture of alkoxyoxetane comprising at least a major amount of a 3-alkoxyoxetane of the formula,

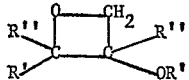

where R' is a monovalent hydrocarbon radical free of aliphatic unsaturation selected from monovalent aryl hydrocarbon radicals and lower alkyl radicals, and R" is selected from hydrogen and R' radicals.

2. A method in accordance with claim 1, employing an alkoxyoxetane mixture comprising at least a major amount of said 3-alkoxyoxetane.

3. A method in accordance with claim 2, utilizing a mixture of 2,2-diphenyl-3-ethoxyoxetane and 4,4-diphenyl-2-ethoxyoxetane.

4. A method in accordance with claim 2 utilizing a mixture of 2-phenyl-3-n-butoxyoxetane and 4-phenyl-2-n-butoxyoxetane.

5. A method in accordance with claim 2 utilizing a mixture of 2-phenyl-3-ethoxyoxetane and 4-phenyl-2-ethoxyoxetane.

6. A method in accordance with claim 1 utilizing 2,2-dimethyl-3-n-butoxyoxetane.

7. A method in accordance with claim 1 utilizing 2,2-dimethyl-3-ethoxyoxetane.

References Cited

Searles: Heterocyclic Compounds With Three and Four Membered Rings, 1964, Weissberger, Interscience Pub., New York, part 2, pp. 990–991.

Barbot: Annales de Chimie, 11, pp. 522, 523, 588–603, 1939.

Bittrer et al.: J. Am. Chem. Soc., 77, pp. 1429–1434, 1955.

HOWARD T. MARS, Primary Examiner

U.S. Cl. X.R.

260—612 D, 614 R